US012118612B2

(12) United States Patent
Brown

(10) Patent No.: US 12,118,612 B2
(45) Date of Patent: Oct. 15, 2024

(54) SECURITIES BASED CARD SPENDING SETTLEMENT MANAGEMENT SYSTEM AND METHOD

(75) Inventor: Jennifer C Brown, Tarzana, CA (US)

(73) Assignee: The Investor Card LLC, Northridge (CA)

( * ) Notice: Subject to any disclaimer, the term of this patent is extended or adjusted under 35 U.S.C. 154(b) by 0 days.

(21) Appl. No.: 13/597,292

(22) Filed: Aug. 29, 2012

(65) Prior Publication Data

US 2014/0067565 A1    Mar. 6, 2014

(51) Int. Cl.
*G06Q 40/04*    (2012.01)
*G06Q 20/20*    (2012.01)
*G06Q 20/40*    (2012.01)

(52) U.S. Cl.
CPC .......... *G06Q 40/04* (2013.01); *G06Q 20/20* (2013.01); *G06Q 20/405* (2013.01)

(58) Field of Classification Search
CPC .... G06Q 20/204; G06Q 20/20; G06Q 20/202; G06Q 20/322; G06Q 20/40
USPC .......................................................... 705/17
See application file for complete search history.

(56) References Cited

U.S. PATENT DOCUMENTS

| 4,346,442 A | 8/1982 | Musmanno |
| 4,376,978 A | 3/1983 | Musmanno |
| 4,597,046 A | 6/1986 | Musmanno et al. |
| 4,774,663 A | 9/1988 | Musmanno et al. |
| 5,408,633 A * | 4/1995 | Katsumura ........... G06F 3/0601 235/492 |
| 6,164,533 A | 12/2000 | Barton |
| 7,158,950 B2 | 1/2007 | Snyder |
| 7,698,194 B2 | 4/2010 | Heiges et al. |
| 7,873,568 B1 | 1/2011 | Sappington |
| 8,005,742 B2 | 8/2011 | Heiges et al. |
| 2002/0023040 A1* | 2/2002 | Gilman ................ G06Q 40/04 705/37 |
| 2002/0059127 A1* | 5/2002 | Brown ................. G06Q 40/04 705/36 R |
| 2004/0167844 A1* | 8/2004 | Dolan .................. G06Q 40/02 705/36 R |
| 2004/0182922 A1* | 9/2004 | Talarico, Jr. ........... G06Q 20/28 235/380 |
| 2005/0049952 A1* | 3/2005 | Carter ................... G06Q 40/06 705/36 R |

(Continued)

OTHER PUBLICATIONS

Koco, Linda. The question is: How can you not offer equity products? National Underwriter, Life, health/financial services ed.; Erlanger vol. 105, Iss. 33, (Aug. 13, 2001): 4-6. (Year: 2001). (Year: 2001).*

(Continued)

*Primary Examiner* — Florian M Zeender
*Assistant Examiner* — Fawaad Haider
(74) *Attorney, Agent, or Firm* — Ivan M. Posey, Esq.

(57) ABSTRACT

A system for managing a securities-based card spending account is disclosed. The system comprises a processor and an account comprising one or more securities. A first set of instructions is executable on the processor that is capable of allowing the setting of trade parameters defining percentages of the one or more securities to be traded to cover a purchase. A second set of instructions is executable on the processor for triggering one or more trades of the one or more securities according to the percentages defined in the trade parameters.

4 Claims, 16 Drawing Sheets

(56) References Cited

U.S. PATENT DOCUMENTS

| | | | |
|---|---|---|---|
| 2005/0154662 A1* | 7/2005 | Langenwalter | G06Q 40/00 |
| | | | 705/35 |
| 2005/0203833 A1 | 9/2005 | Pembroke | |
| 2005/0273413 A1* | 12/2005 | Vaudrie | G06Q 40/00 |
| | | | 705/36 R |
| 2006/0076400 A1* | 4/2006 | Fletcher | G06Q 20/12 |
| | | | 235/379 |
| 2006/0080231 A1 | 4/2006 | Numata | |
| 2007/0055602 A1* | 3/2007 | Mohn | G06Q 40/10 |
| | | | 705/36 R |
| 2007/0118449 A1 | 5/2007 | De La Motte | |
| 2007/0244784 A1 | 10/2007 | Nowacek | |
| 2008/0027862 A1 | 1/2008 | Daly-DeSchryver | |
| 2008/0065532 A1* | 3/2008 | De La Motte | |
| 2009/0030840 A1 | 1/2009 | Kane | |
| 2009/0037305 A1 | 2/2009 | Sander et al. | |
| 2011/0313946 A1 | 12/2011 | Browne et al. | |
| 2012/0197799 A1* | 8/2012 | Macklin | G06Q 20/10 |
| | | | 705/44 |
| 2014/0040099 A1* | 2/2014 | Keitz | G06Q 20/02 |
| | | | 705/37 |
| 2014/0040100 A1* | 2/2014 | Keitz | G06Q 40/04 |
| | | | 705/37 |

OTHER PUBLICATIONS

Reportal; Kuching. KVH Industries, Inc.—10K or Int'l Equivalent, 2012. vol. Ia-Me. (Year: 2012).*

Mui, Ylan Q. The credit balancing act; Card issuers that raised your rates yesterday offer to help you pay less today. The Washington Post; Washington, D.C. [Washington, D.C]. Jan. 17, 2010: G.1 (Year: 2010).*

* cited by examiner

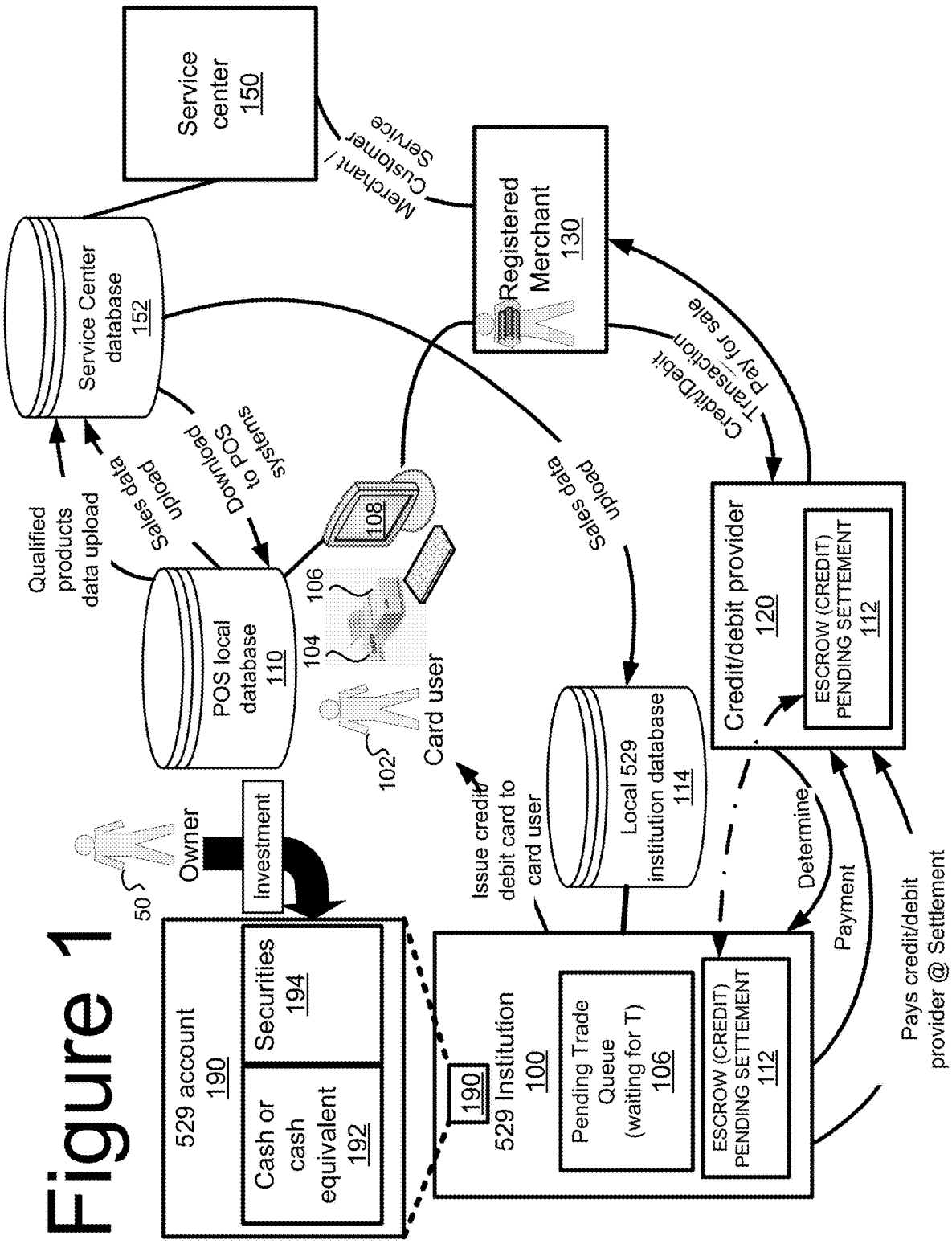

SECURITIES BASED CARD SPENDING SETTLEMENT MANAGEMENT SYSTEM AND METHOD

FIELD OF THE INVENTION

The present invention generally relates to a securities based card spending settlement management system and method. More specifically, the invention relates to a system and method for automatic approval of college savings plan purchases, and funding of such purchases through the automated triggering of trades.

BACKGROUND OF THE INVENTION

A 529 plan is a tax-advantaged investment vehicle in the United States designed to encourage saving for the future higher education expenses of a designated beneficiary. 529 plans are named after section 529 of the Internal Revenue Code 26 U.S.C. § 529. While most plans allow investors from out of state, there can be significant state tax advantages and other benefits, such as matching grant and scholarship opportunities, protection from creditors and exemption from state financial aid calculations for investors who invest in 529 plans in their state of residence.

There are two types of 529 plans: prepaid and savings. Prepaid plans allow one to purchase tuition credits at today's rates to be used in the future. Therefore, performance is based upon tuition inflation. Currently, 12 states provide a prepaid tuition plan. Savings plans are different in that all growth is based upon market performance of the underlying investments, which typically consist of mutual funds. Most 529 savings plans offer a variety of age-based asset allocation options where the underlying investments become more conservative as the beneficiary gets closer to college age.

Although states administer savings plans, record-keeping and administrative services for many savings plans are usually delegated to a mutual fund company or other financial services company.

With the Economic Growth and Tax Relief Reconciliation Act of 2001 (EGTRRA), 529 plans gained their current prominence and tax advantages. Qualified distributions from 529 plans for qualified higher education expenses are exempt from federal income tax.

According to the way the current system works in most states, a benefactor establishes an account and contributes assets or funds to it. Section 529 (c)(1)(B) of the Code states that the amount put into the account by a contributing benefactor for a designated beneficiary will not be included in the benefactor's gross income with respect to any distribution or earnings under the program. That is, no federal tax is due on money withdrawn from a 529 investment account, a long term savings account (LSA), or a similar type account whose funds are used for the payment of qualified higher education expenses (qualified purchases or items) if the money is used to pay for qualified and substantiated expenses incurred for the beneficiary's higher education.

Money from a 529 plan can be used for tuition, fees, books, supplies and equipment required for study at any accredited college, university or vocational school in the United States and at some foreign universities.

The money can also be used for room and board, as long as the fund beneficiary is at least a half-time student. Off-campus housing costs are covered up to the allowance for room and board that the college includes in its cost of attendance for federal financial-aid purposes. A distribution from a 529 plan that is not used for qualified educational expenses is subject to income tax and an additional 10% early-distribution penalty with little exception (for example, if the beneficiary becomes disabled), and possibly state taxes and penalties too.

U.S. Patent Application Serial No. 2004/0167844A states that a major problem with managing these programs and accounts is that present technology does not adequately address the qualification, substantiation, and accounting with respect to the accounts, nor the tax reporting that is required for purchases and payments of a beneficiaries' higher education expenses paid for with funds from a Section 529 investment account. First, the Internal Revenue Service (IRS) presently offers no guidance to the benefactor, consumer, investment manager, beneficiary, tax advisor, or accountant as to how to qualify or substantiate purchases made with funds from a 529 account for the benefit of the beneficiary. Second, state sponsored tuition reimbursement programs do not have a computer based system capable of handling the current number of accounts and their associated asset base, much less those which are estimated to soon be in place.

However, the prior art, including the above-cited application, does not address handling completing purchases using a college savings account that is comprised of securities, which may not have immediate liquidity. These and other objectives are provided by the system and methods described herein.

SUMMARY OF THE INVENTION

According to one preferred embodiment, a system for managing a securities-based card spending account comprises a processor, an account comprising one or more securities, a first set of instructions executable on the processor capable of allowing the setting of trade parameters defining percentages of the one or more securities to be traded to cover a purchase, and a second set of instructions executable on the processor for triggering one or more trades of the one or more securities according to the percentages defined in the trade parameters.

According to another preferred embodiment, a method is for managing a securities-based card spending account wherein the account comprises one or more securities. The method comprises allowing the setting of trade parameters defining percentages of the one or more securities to be traded to cover a purchase, and triggering one or more trades of the one or more securities according to the percentages defined in the trade parameters.

According to yet another preferred embodiment, a point of sale system comprises a processor, a card reader, a database of one or more issuer identification numbers capable of identifying one or more cards for the purchase of qualified items, a first set of instructions executable on the processor capable of comparing an issuer identification number from a card read by the card reader to the database of one or more issuer identification numbers to determine if the card is one of the cards for the purchase of qualified items, a second set of instructions executable on the processor capable qualifying the items if the first set of instructions determines that the card is one of the cards for the purchase of qualified items, and a third set of instructions executable on the processor for transmitting a transaction to trigger a trade of one or more securities to cover the purchase of qualified items.

According to yet another preferred embodiment, a method of qualifying items in a point of sale system comprises storing a database of one or more issuer identification numbers capable of identifying one or more cards for the purchase of qualified items, comparing an issuer identification number from a card read by a card reader to the database of one or more issuer identification numbers to determine if the card is one of the cards for the purchase of qualified items, qualifying one or more items for purchase upon determining that the card is one of the cards for the purchase of qualified items, and transmitting a transaction for the qualified purchases to trigger a trade of one or more securities to cover the purchase of qualified items.

In yet another preferred embodiment, a system for managing a securities-based card spending account, comprises a processor, an account comprising one or more securities, a first set of instructions for setting a spending limit for a securities-based card, and a second set of instructions executable on the processor for triggering one or more trades of the one or more securities to cover a purchase using the securities-based card if the purchase does not cause the spending limit to be exceeded.

BRIEF DESCRIPTION OF THE DRAWINGS

FIG. 1 is a system entity and flow diagram that presents data flow in one embodiment of a college savings account spending and payment system;

DETAILED DESCRIPTION OF THE INVENTION

Figure 2A:
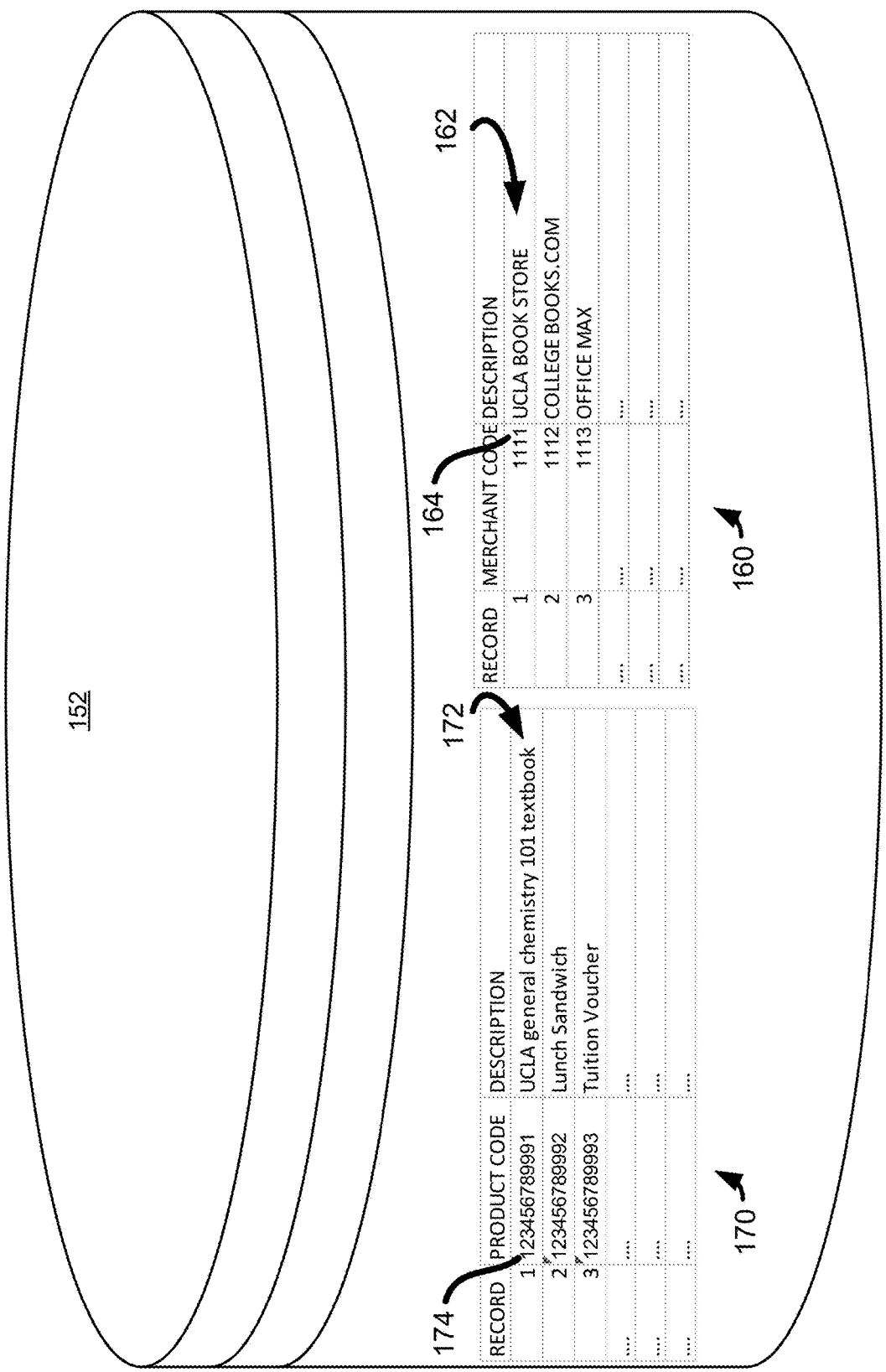
FIG. 2A is a diagrammatic representation of exemplary database tables used in a database for the embodiment of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a securities based card spending settlement management system and method. With reference to FIG. 1, a system entity and flow diagram presents an overview of one embodiment of the system. A 529 Institution 100 may comprise a mutual fund company or other financial services company. The 529 institution 100 provides investment and distribution services, including but not limited to, collecting contributions from plan owners 50, purchasing securities for the plan, including in the form of mutual funds, and distributing cash funds to or on behalf of the beneficiary for a 529 or other investment account 190 (herein called 529 account) for purchases using 529 plan funds, which may be provided to a merchant 130 selling qualified products to a card holder 102 using a credit or debit card 104. The merchant may comprise, by way of example, and not by way of limitation, on campus/off campus bookstores, retail supply stores, university registrars, university cashiers, online merchants, and the like (herein collectively referred to as registered merchants 130). The card holder 102 may be either the beneficiary for the 529 account 190 or the owner 50 of the 529 account 190, or both.

In one embodiment, when a beneficiary for the 529 account 190 is ready to begin his or her higher education, a credit or debit card 104 may be provided to the owner 50, and the beneficiary if the owner desires, who may each become a card holder 102 to each receive a card 104 created and provided from the 529 institution 100. Alternatively, the 529 institution 100 may have a third party provider create and provide the card 104 to the owner 50, and beneficiary if desired. Herein, one or more card holders 102 will be referred to as the card holder 102 in the singular, but it is to be understood that there may be one or more card holders 102 tied to each account 190.

In one embodiment, the issued card 104 may be directly linked to the cash portion 192 of a 529 account 190, as each account may have a cash or cash equivalent portion 192 (herein called cash portion 192) and a securities portion 194.

As those skilled in the art would recognize, typically, when the owner 50 invests in a 529 account 190 for the beneficiary, the owner 50 may work with brokers, agents and/or financial advisors of the 529 institution 100, or other independent brokers, agents and/or financial advisors that sell 529 plans, to maximize his or her investment by purchasing shares in various securities offered by the 529 institution 100. As those skilled in the art would recognize, such accounts would be referred to as advisor-sold accounts.

As those skilled in the art would recognize, alternatively, the owner 50 may be able to start, manage, and issue cards without assistance of a broker, agent, or financial advisor directly from the 529 institution 100 using an online or paper-mailed account setup and management system. Those skilled in the art would recognize that self started and managed accounts would be referred to as direct-sold accounts.

In one embodiment, merchant codes may be entered into a service center database 152 that may specify registered merchants 130 from which the card holder 102 may make qualified purchases. For each 529 institution 100, a subset of the merchant codes may be downloaded to the 529 institution's local database 114 to indicate which merchants are registered to accept the card 104. If the card holder 102 does go to an unregistered merchant to make a purchase of a qualified item, then that can be dealt with in several ways depending on the preference of the service center 150 and/or the 520 institution 100. By way of example and not by way of limitation, the service center 150, may be notified that the merchant is, in fact, unregistered, and an e-mail, mail, or other communication may be automatically sent to the unregistered merchant to offer the unregistered merchant to become a registered merchant 130. In one embodiment, the 529 institution 100 may notify the service center 150 upon rejection of a transaction from an unregistered merchant, in which case service center staff may follow-up with the unregistered merchant in an effort to register the merchant.

Figure 2B:
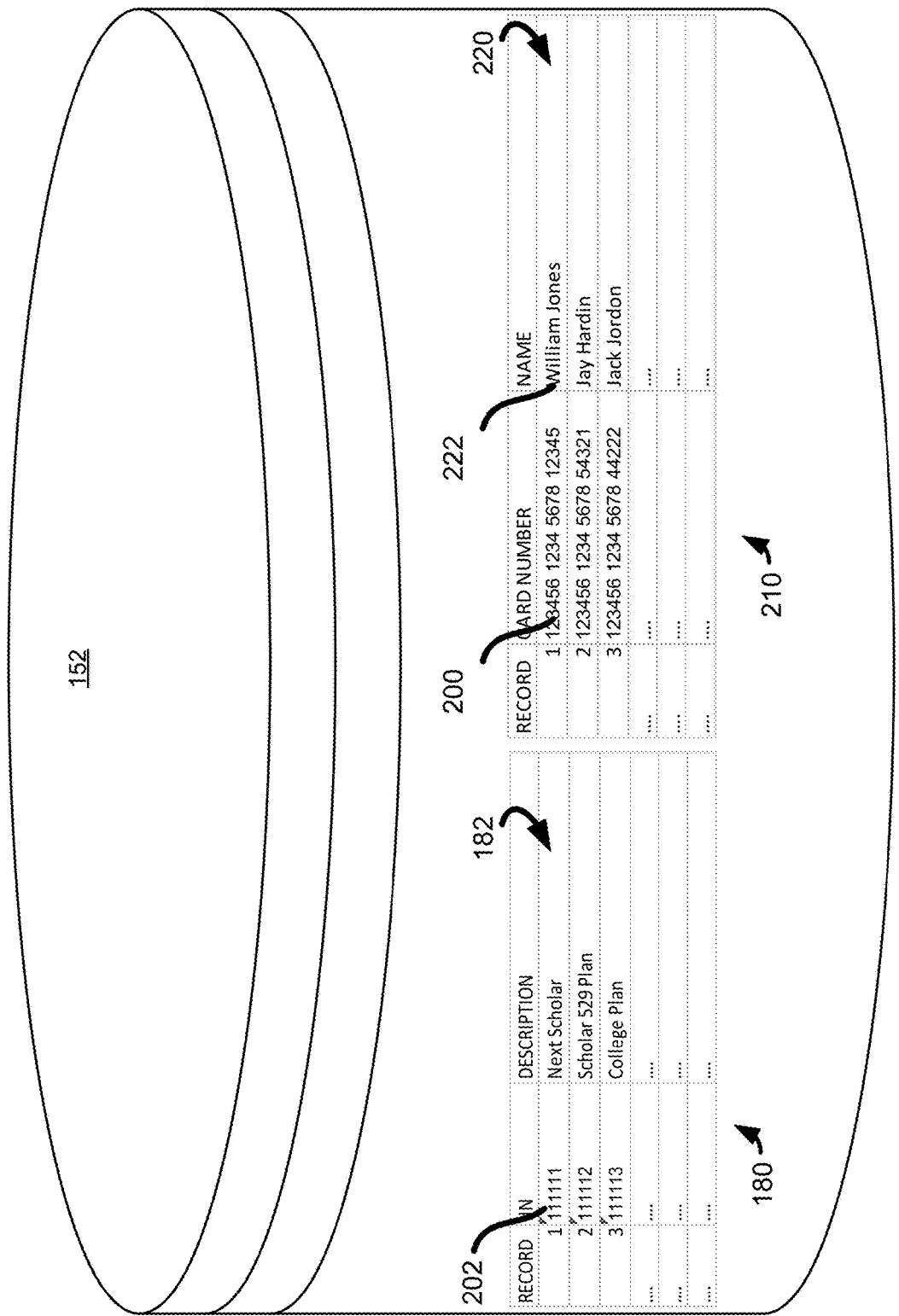
FIG. 2B is a diagrammatic representation of further exemplary database tables of the database of FIG. 2A.

With reference to FIGS. 2A-2B, a diagrammatic representation of exemplary tables of the service center database 152 used in the embodiment of FIG. 1 is shown. In one embodiment, by way of example, and not by way of limitation, in a registered merchant table 160, each merchant record 162 may store a merchant code 164 to identify the registered merchants 130 for the 529 plan offered by the 529 institution 100. In one embodiment, the service center database 152 may push the registered merchant table 160 to the local 529 institution database 114.

As explained below, in one embodiment, each time the card holder 102 presents his or her card 104, the merchant's POS system may determine whether to run a qualification process or not. In one embodiment, only registered merchants 150 may have a qualification process in their POS system 108. Unregistered merchants may not have the qualification process for qualifying individual items in the POS system 108, and thus may read the card 104 as a non-529 institution issued credit card. Registered merchants 150, having completed the qualification process, may then pass the subtotal of only qualified items to the credit card machine 106, which then may process the transaction using the card 104. When the transaction arrives at the 529 institution 100, the 529 institution 100 may read the merchant code and recognize it as identifying a registered merchant 150 within the local 529 institution database 114 and proceed with the next step of the transaction as described below. If the transaction is from an unregistered merchant, when the transaction arrives at the 529 institution 100, the 529 institution 100 may read the merchant code and may not recognize it as identifying a registered merchant 150 and decline the transaction. Additionally, the 529 institution 100 may send a message to the service center 150 notifying the service center of the unregistered merchant to allow service center staff to contact the unregistered merchant and attempt to register the merchant.

In one embodiment, universal purchase codes (UPCs), ISBN codes, quick response (QR) or other product codes (herein collectively referred to as product codes) of qualified items may each be entered by each merchant 130 into their local POS database 110. In one embodiment, after each merchant 130 enters the product data, it may be uploaded to a data table 170 (FIG. 2A) within the service center database 152. The product code 174 of each qualified product, such as a qualified book or qualified food item, may be entered into a record 172 in the product data table 170. In one embodiment, these qualified product codes 174 may be downloaded to a local database 110 of the POS 108 of each of the new registered merchants 130 as a convenience so they may have a head start on entering their own product qualification data. Alternatively, the initial product data may be sent to or from the registered merchant 130 by CD-ROM, or other readable media.

Figure 3:
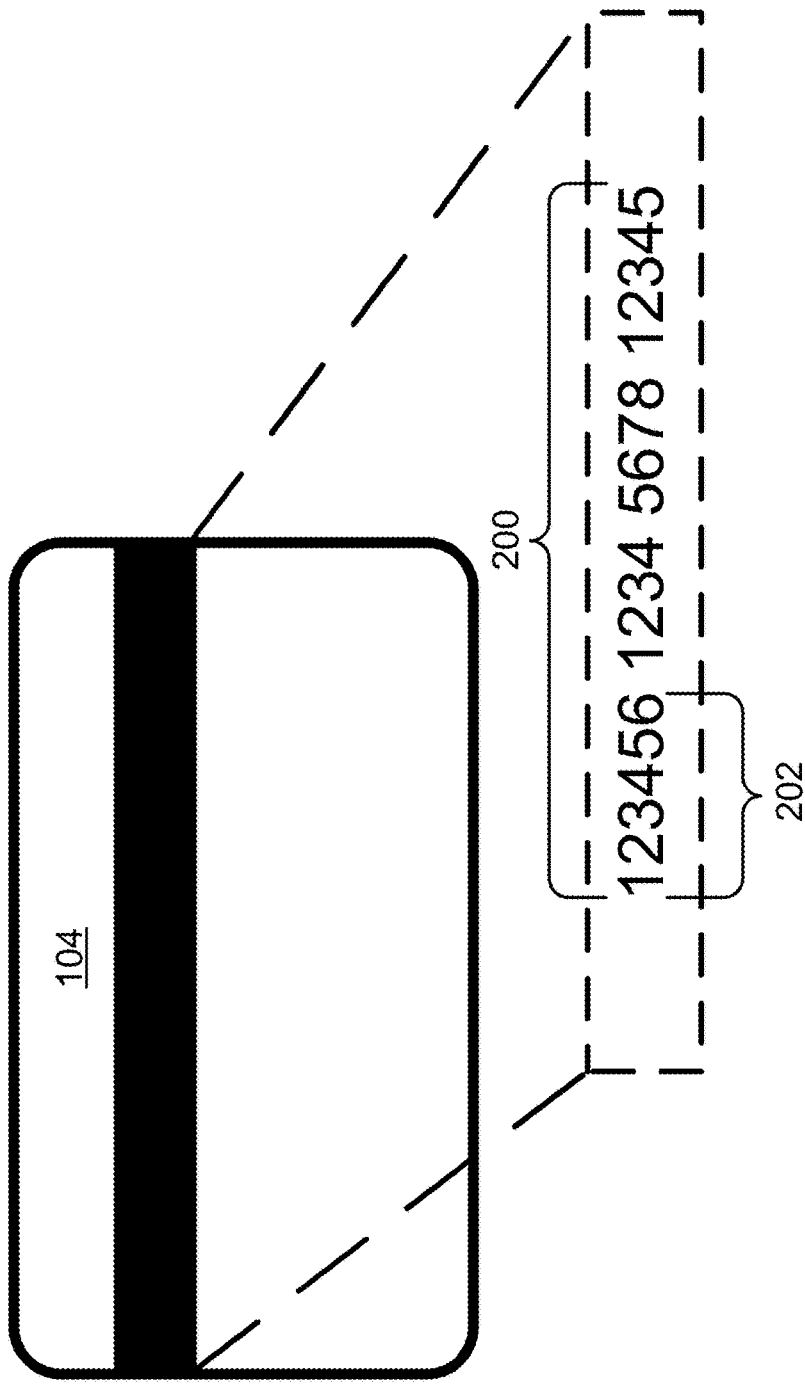
FIG. 3 is a diagrammatic illustration of a debit or credit card and the information stored thereon that can be used with the embodiment of FIG. 1.

With reference to FIG. 3, a diagrammatic illustration of a debit or credit card 104 and the information stored thereon that can be used with the embodiment of FIG. 1 is shown. Bank card numbers 200 are found on payment cards 104, such as credit cards and debit cards. They have a certain amount of internal structure and share a common numbering scheme. Bank card numbers are allocated in accordance with ISO/IEC 7812. The bank card number 200 merely identifies the card 104, which is then electronically associated with a particular card holder 102 and also to the card holder's designated account 190. An ISO/IEC 7812 number 200 is typically 16 digits in length. It comprises:

a six-digit issuer identification number (IIN) 202, the first digit of which is the major industry identifier (MII), a variable length (up to 12 digits) individual account identifier, a single check digit calculated using the Luhn algorithm.

In one embodiment, the six-digit IIN 202 of the card 104 may identify the 529 institution 100 for which the card 104 is issued, and the whole card number 200 may identify the account to which the card 104 is tied. This information may used by the registered merchant's POS system 108 to recognize the card 104 as one linked to a 529 plan from the 529 institution 100.

As noted above, the POS systems 108 of the registered merchants 130 may store the six digit IIN numbers for the 529 plans that may be used for sales at the merchant 130, and the product codes 174 for the products that may be purchased for each of those IIN 202. The IIN 202 may trigger the POS system 108 to run a qualification process for products scheduled for purchase against qualified products in the local database 110. In one embodiment, the registered merchant 130 may not have a POS system. In those cases, the registered merchant 130 may process the card purchase under IRS rules and regulations.

Each 529 plan, or state regulation, may have different rules on how much of the 529 account 190 needs to be in cash or cash equivalents, at specific times or ages of the beneficiary 102. However, when the beneficiary starts his or her education, such rules and regulations may still allow much of the 529 account 190 to remain as a securities portion 194. For example, when the card holder 102 receives the card 104, the owner 50 may have decided with his or her financial advisor to keep fifty percent (50%) of the 529 account 190 as the securities portion 194 of the account 190. This currently has the potential of causing issues when attempting to make immediate purchases at a registered merchant 130.

Figure 4:
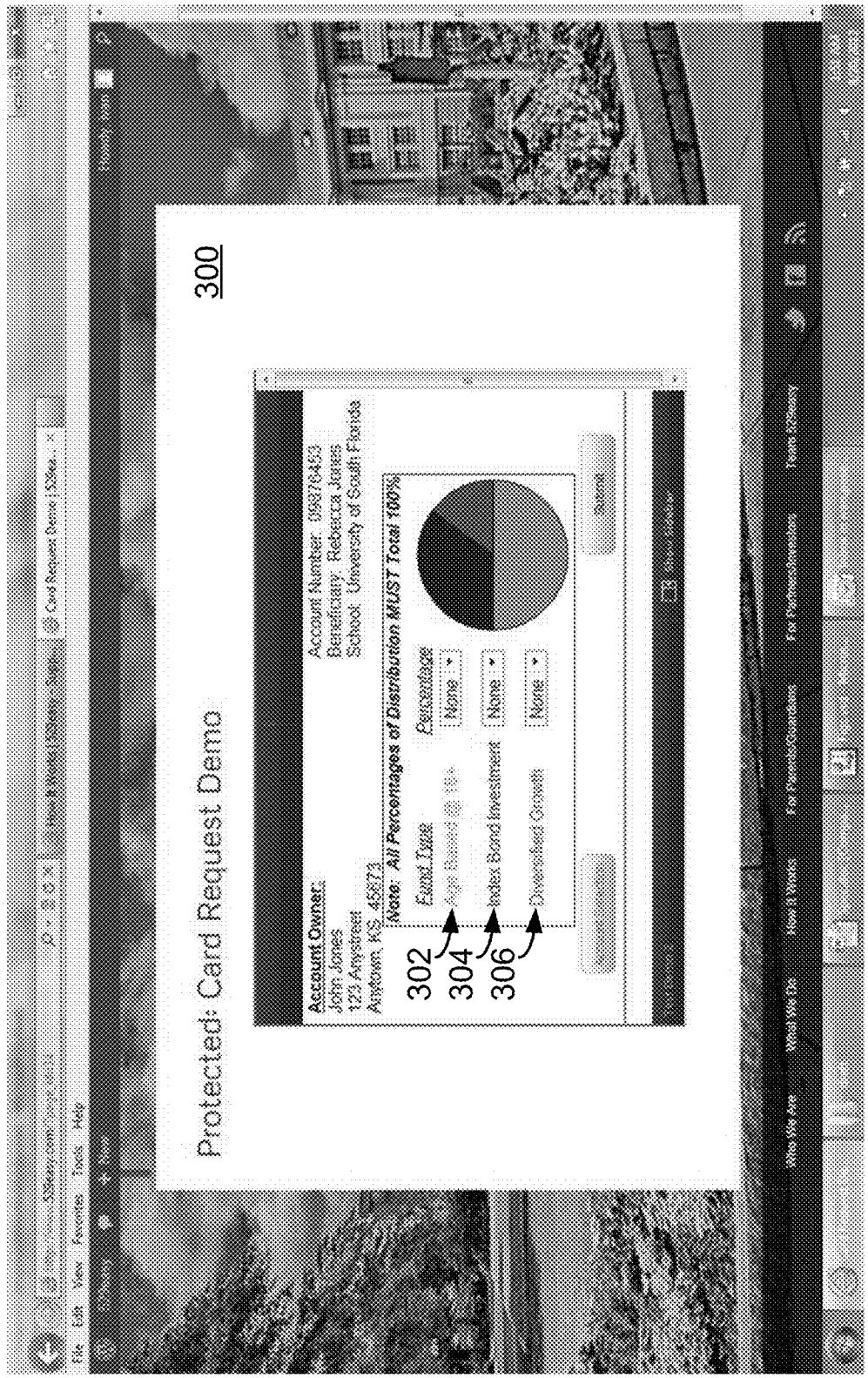
FIG. 4 is a percentage distribution screen that may be used with the embodiment of FIG. 1.

In one embodiment, in order to solve this issue, a trade-trigger system may be implemented. With reference to FIG. 4, when the owner 50 requests that a card 104 is issued to a card holder 102 for the 529 account 190, the owner 50, with or without the help of the financial advisor at the 529 institution 100, may be provided with an online percentage distribution screen 300 for setting up parameters of the 529 account 190 for trade-trigger distributions. These parameters may include, by way of example and not by way of limitation, percentage of distributions from money markets and other cash equivalents, mutual funds, exchange traded funds, or other securities investments for which trades are automatically triggered as described below when the card holder 102 makes a purchase.

By way of example, and not by way of limitation, the owner 50 may select the percentage of each type of fund 302, 304, 306 within the account 190 for which a trade may be automatically trigged upon a qualified purchase. For example, when the card holder 102 swipes the card 104 to complete a purchase, then the pre-defined allocation by the owner 50 is applied. In one embodiment, there may be a requirement that the total of the pre-defined allocation percentages may equal 100%. However, the owner may change the allocations at any time, as long as this 100% total requirement is met. For example, for a single purchase, the owner 50 may have pre-defined for 49% of that purchase to come out of one type of fund, 50% of the that same purchase to come out of another type of fund, and 1% to come out of yet another type of fund. In one embodiment, the trade of each fund may be simultaneously triggered. In one embodiment, any combination of percentages may be selected, as long as the total is 100% for all funds for each transaction.

Further, the owner may wish to change the number and types of funds in which the securities portion 194 of the account 190 is invested. However, the owner must update the pre-defined allocations. In one embodiment, the pre-defined allocations for triggering trades when a transaction is received may still need to equal 100%.

In one embodiment, the owner 50 may work with the 529 institution 100 for all account 190 related services, issues, changes, card issuing, and/or other administrative needs. However, in another embodiment, many or all of these tasks may be performed online. For example, for issuing cards 104 for the account 190, an online process may be very helpful to some owners 50.

Figure 5:
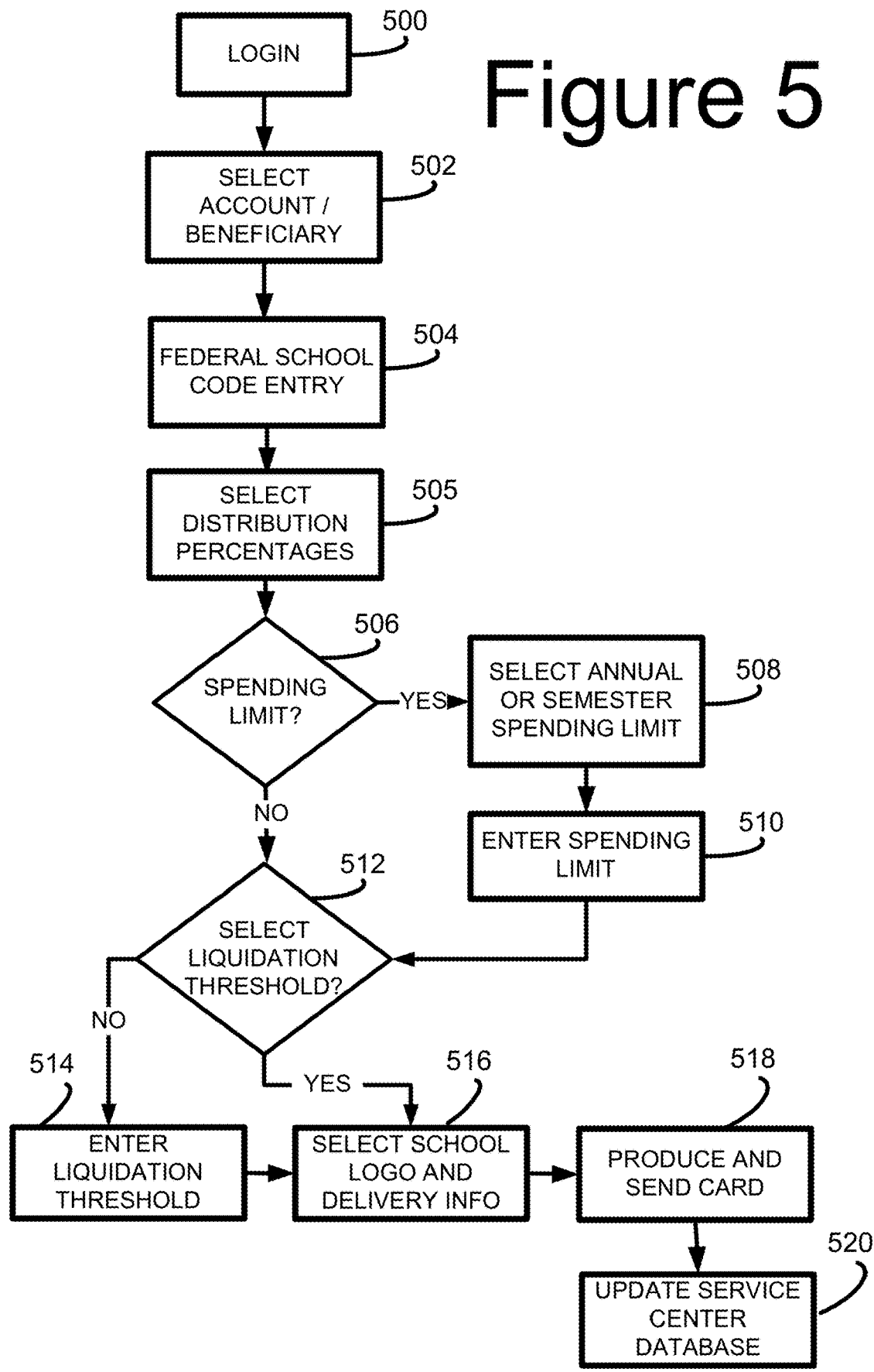
FIG. 5 is a flow chart that illustrates steps performed by a system for initially setting up and issuing a card for an exemplary 529 plan for a 529 institution according to the embodiment of FIG. 1.
Figure 6:
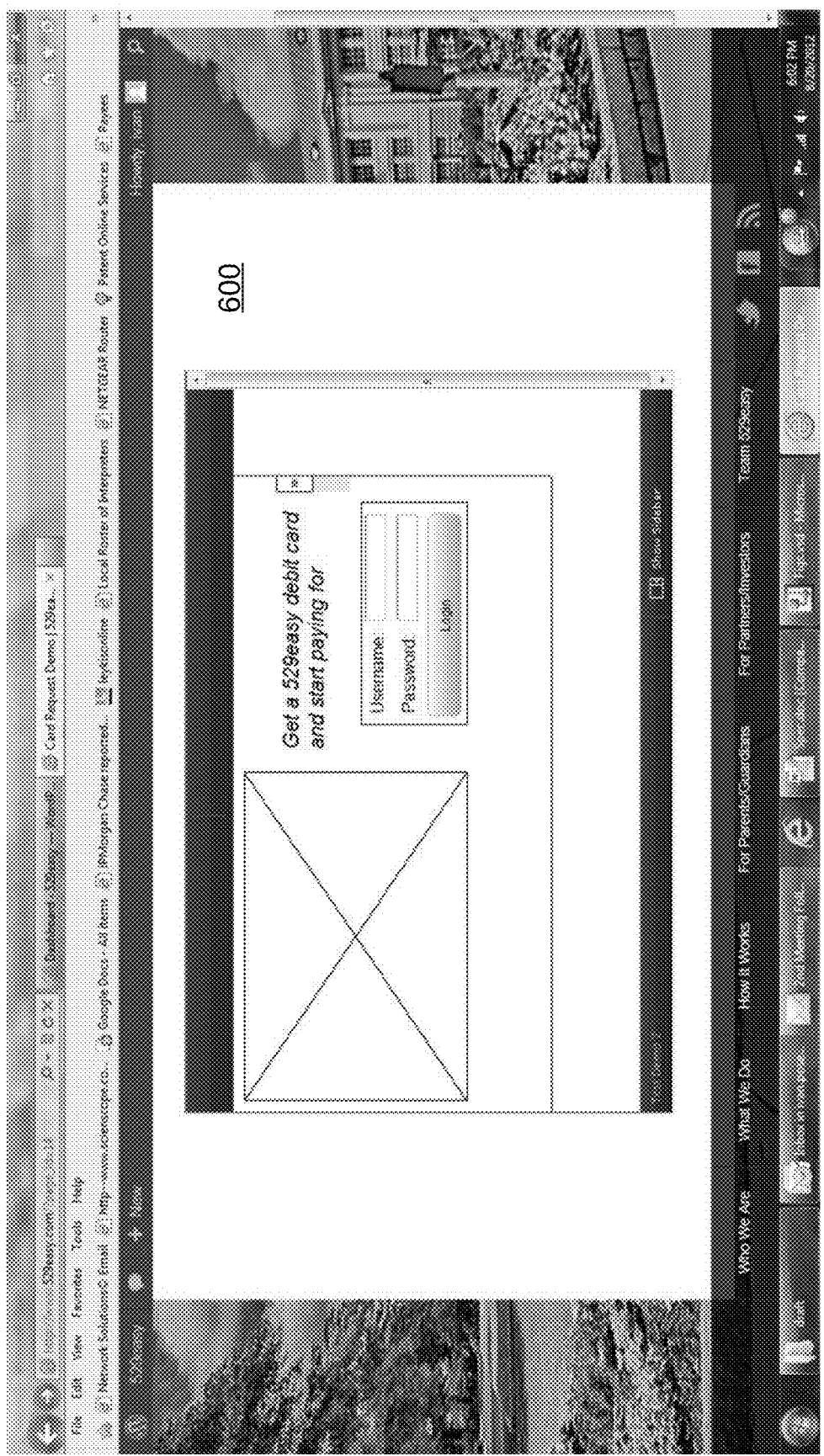
FIG. 6 is an exemplary login screen that may be used with the embodiment of FIG. 1.

With reference to FIG. 5, a flow chart illustrates steps performed by the system for initially setting up and issuing a card 104 for an exemplary 529 plan for a 529 institution 100. In step 500, the owner 50 may login with a login ID and password provided by the 529 institution 100. With reference to FIG. 6, an exemplary login screen 600 that may be used is shown.

Figure 7:
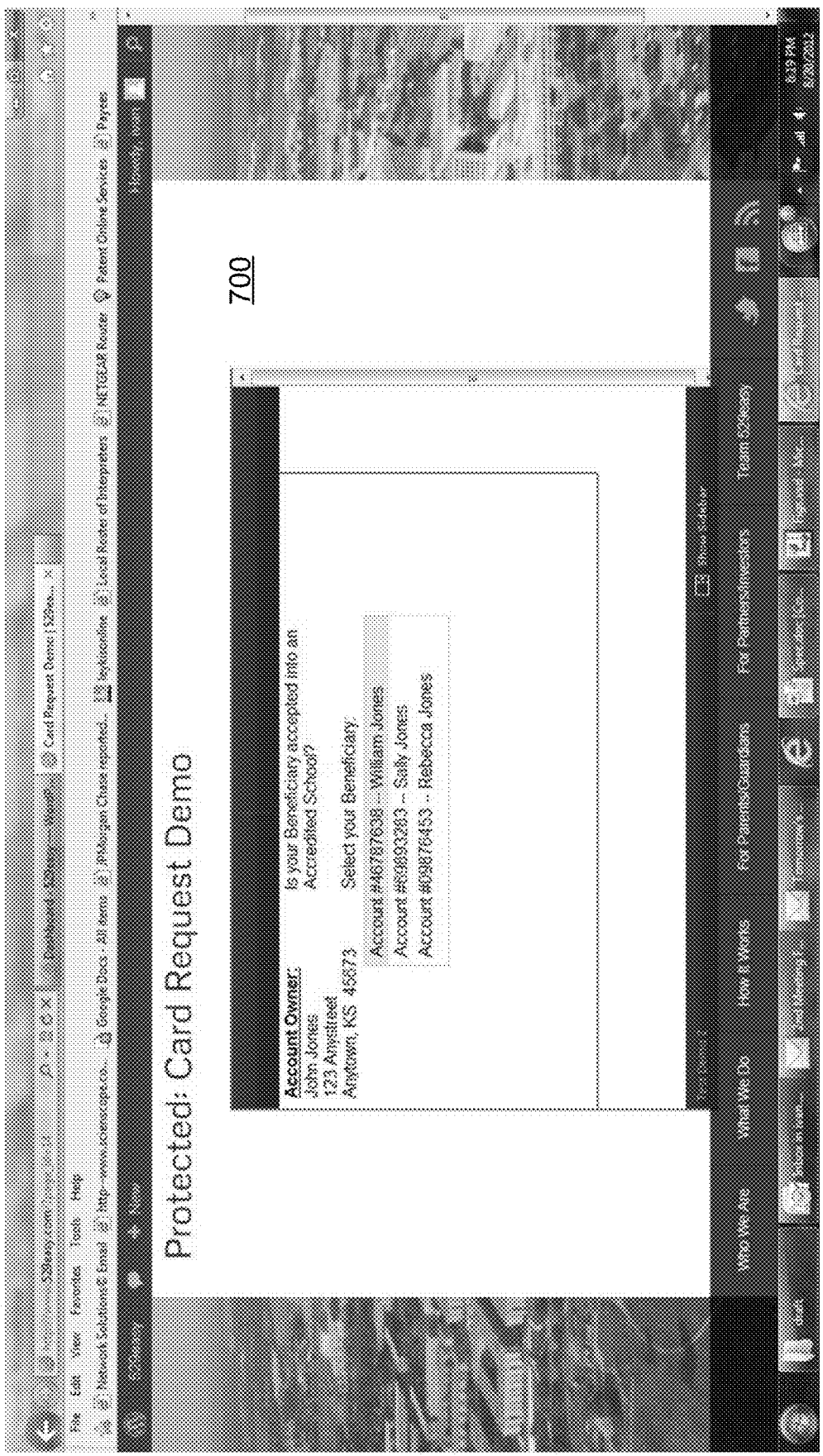
FIG. 7 is an exemplary accounts/beneficiaries selection screen according the embodiment of FIG. 1.

With reference back to FIG. 5, in step 502, the owner may next be provided with a selection screen of accounts/beneficiaries. With reference to FIG. 7, an exemplary accounts/beneficiaries selection screen 700 is shown. In screen 700, a selection of accounts and paired beneficiaries may be presented for highlighting. The owner 50 may use the arrow keys or a mouse to select the account and beneficiary for which the card 104 is to be issued.

Figure 8:
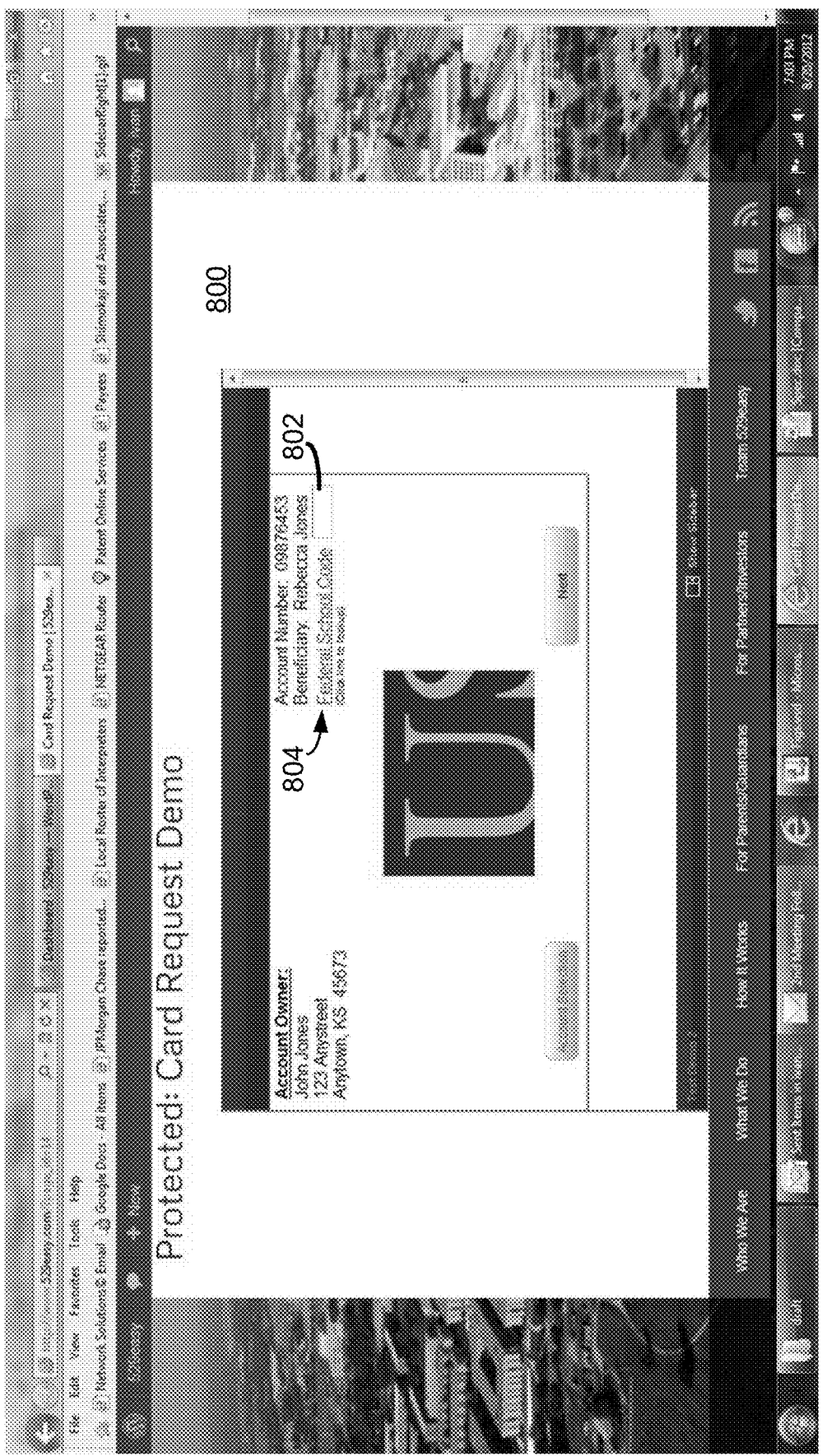
FIG. 8 is an exemplary federal school entry code screen according to the embodiment of FIG. 1.

With reference back to FIG. 5, after selection of the account/beneficiary, in step 504, the owner 50 may next enter the federal school code for the institution the beneficiary selected in step 502 may be attending. With reference to FIG. 8, an exemplary federal school entry code screen 800 is shown. The owner 50 may type in the federal school code that is eligible for use with the 529 plan at the 529 institution 100 in entry field 802 on screen 800. In one embodiment, a hyperlink 804 may be provided to produce a selection list of eligible learning institutions. Upon selection, the code for the eligible institution may be automatically populated in entry field 802.

With reference back to FIG. 5, in step 505, the owner 50 may be directed to the percentage distribution screen 300 described and shown in FIG. 4. As described above with respect to FIG. 4, the owner 50 may select the allocations of securities for which trades are triggered upon receipt of a transaction for a purchase using the card 104.

Figure 9:
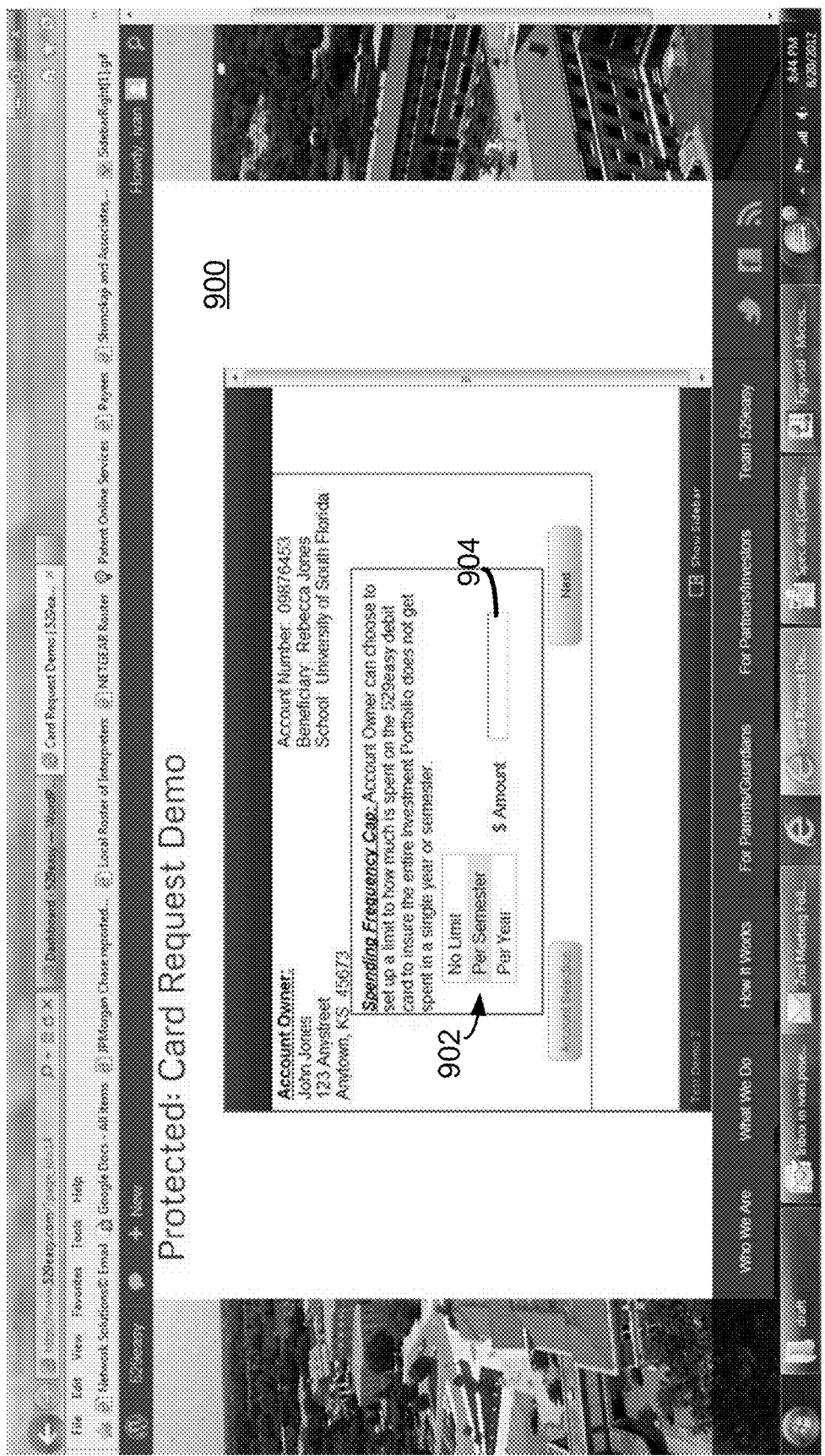
FIG. 9 is an exemplary spending frequency cap screen according to the embodiment of FIG. 1.

In step 506, the owner 50 may decide whether to set a spending limit for the card holder 102. For example, the owner 50 may wish to set an annual or per semester spending limit, or no limit at all. With reference to FIG. 9, an exemplary spending frequency cap screen 900 that may be presented to the owner 50 is shown. The owner 50 may select whether to set spending limits on the card holder 102 in selection box 902. If anything but the no limit selection is selected by the owner 50, then entry box 904 may appear where the owner 50 may enter the limit amount set for the time period selected in selection box 902, step 510 in FIG. 5.

Figure 10:
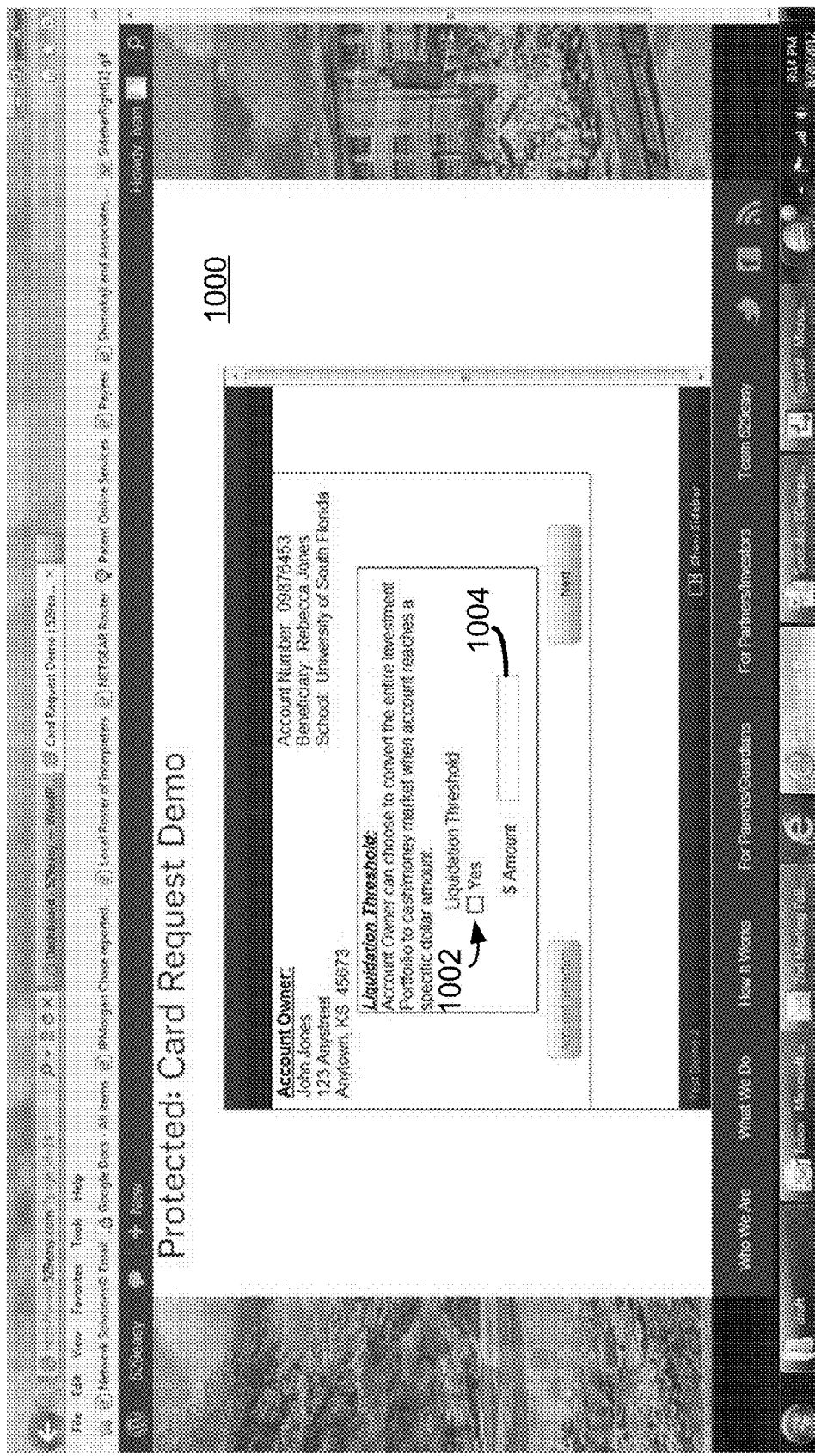
FIG. 10 is an exemplary threshold entry screen according to the embodiment of FIG. 1.

In step 512, the owner 50 is given the option to set a liquidation threshold for the 529 account 190. With reference to FIG. 10, an exemplary threshold entry screen 1000 on which the owner 50 may set the threshold is shown. In step 514 of FIG. 5, if the owner checks checkmark box 1002, then a threshold entry field 1004 may appear in which the owner 50 may enter the threshold amount. This amount entered in field 1004 may be the threshold value at which the owner 50 would wish the entire 529 account 190 to be converted to cash or cash equivalent.

Figure 11:
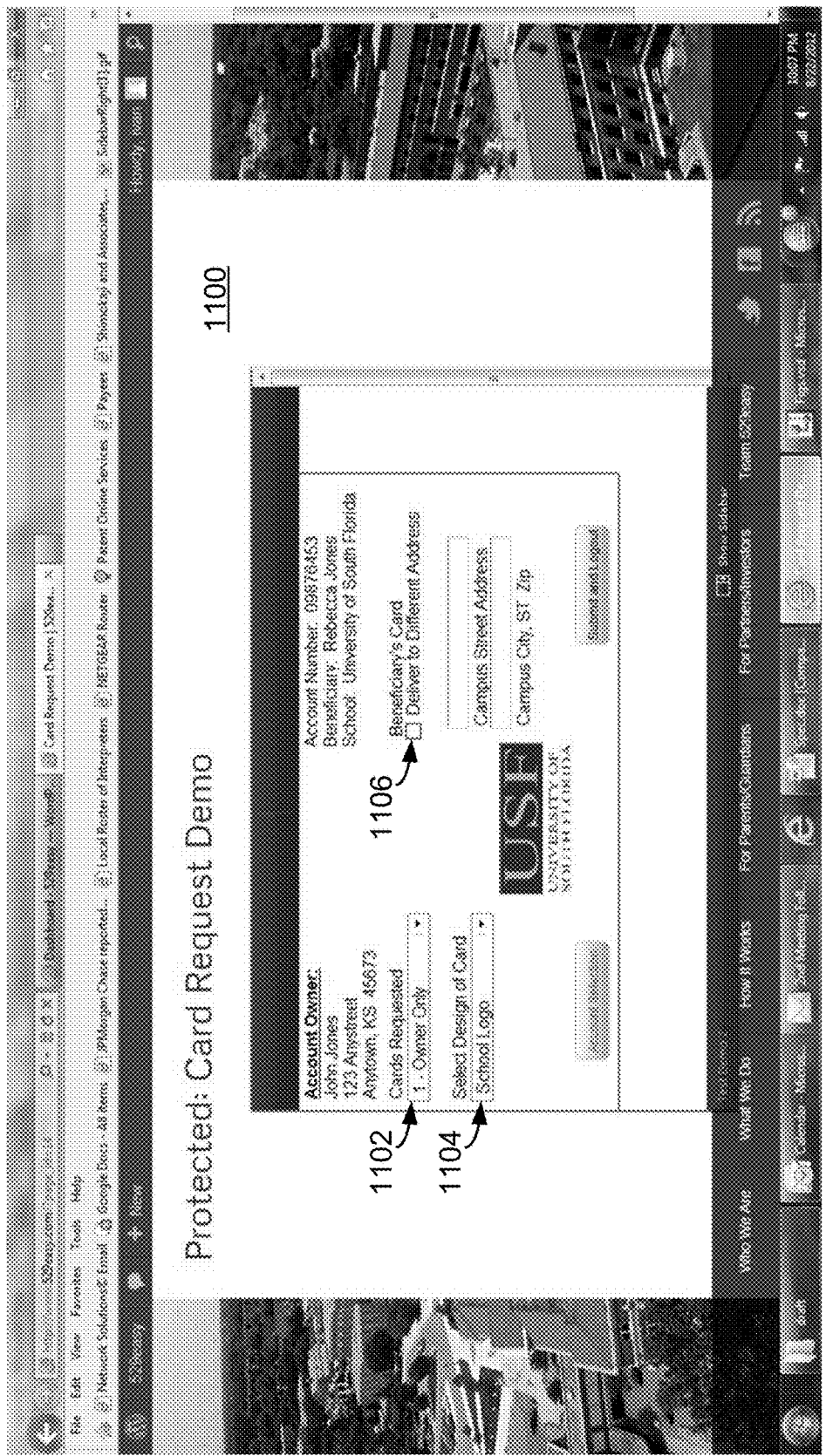
FIG. 11 is an exemplary card delivery information screen according to the embodiment of FIG. 1.

With reference back to FIG. 5, in step 516, the owner 50 may select delivery information and the school logo to appear on the card 104. With reference to FIG. 11, an exemplary card delivery information screen 1100 that may be used for step 516 is shown. For example, a field 1102 may allow the owner 50 to select how many cards to issue (e.g., to owner 50 and/or the beneficiary), and in field 1104, the owner 50 may select the school logo to appear on the card 104, subject to allowance by the school. Further, by checking box 1106, the owner 50 may specify whether a different address should or should not be used to send the card 104 to the beneficiary (for example the beneficiary's campus address). In one embodiment, regulations may require one or more of the cards issued to go to the owner's address on file.

After step 516, the card 104 is produced and sent to the card holder(s) 102, step 518. In one embodiment, in step 520, a data table of card numbers 200 may be uploaded by the 529 institution 100 to the service center database 152. With reference to FIG. 2B, an exemplary card number table 210 in the service center database 152 that may be used is shown. The record 220 may contain, by way of example, and not by way of limitation, the card number 200 for each card holder 102, the card holders' names 222, and other identifying information not shown, including the card holders' address information, and the like.

For every IIN 202 utilized by the 529 plan cards 104, the service center database 152 may store in an IIN table 180 a record 182 representing the IIN 202. Referring back to FIG. 1, when a new IIN 202 is created, the POS systems 106 for the registered merchants 130 may be updated from table 180 to recognize the new IIN 202.

Figure 12A:
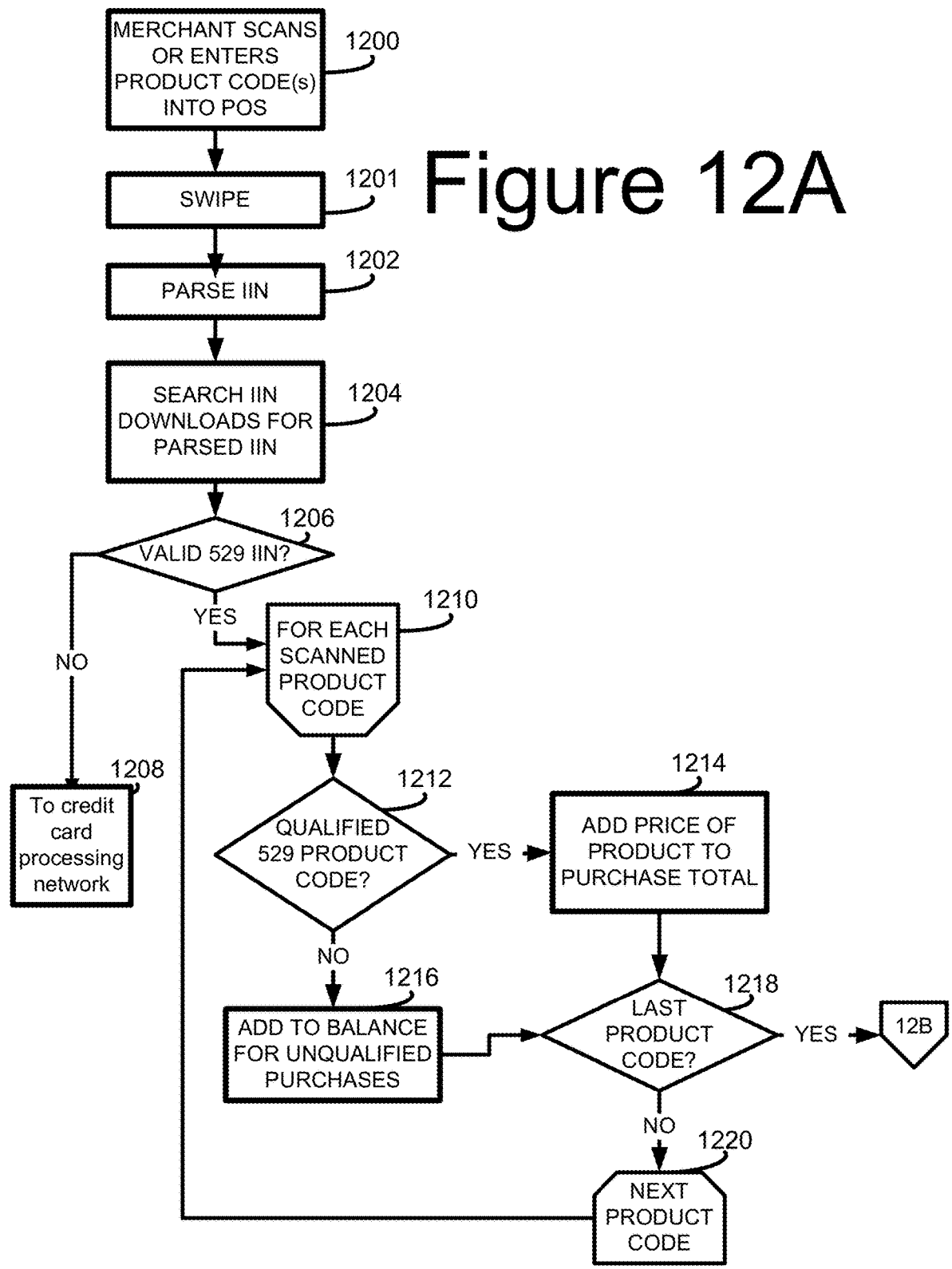
FIGS. 12A-12B is a flow diagram that illustrates steps performed in an exemplary transaction performed by a card holder according to the embodiment of FIG. 1.
Figure 12B:
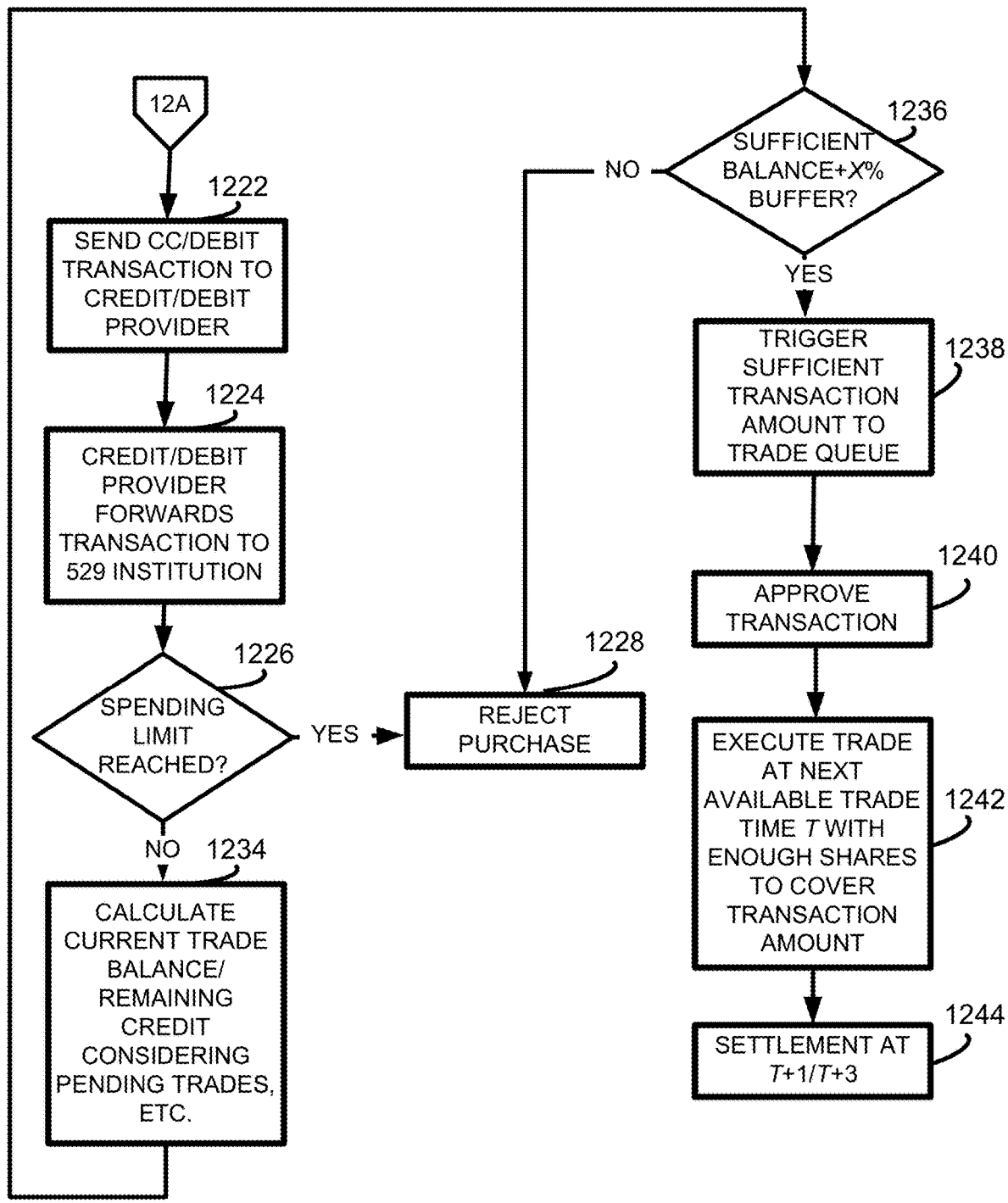

With reference to FIGS. 12A-12B, a flow diagram illustrates steps performed in an exemplary transaction performed by the card holder 102 with a merchant 130. Starting with specific reference to FIG. 12A, in step 1200, after the card holder 102 has selected one or more items to purchase using the card 104, in step 1201, the merchant 130 or card holder 102 may swipe the card 104 using the card machine 106. The POS system 108 may read the card number 200 data from the card 104 (for those card machines 108 tied to a POS system 106). In step 1202, the IIN is parsed.

In one embodiment, IIN information has been downloaded from the service center database 152, the credit/debit card provider 120, or the 529 institution 100. As noted before, each 529 plan may be associated with an IIN 202 created for that plan. In step 1204, the POS system 108 may check against the downloaded IINs 202 to determine if the card presented is linked to a 529 plan of the 529 institution 100. If not, the card 104 is processed through a credit card processing network in step 1208 as is currently performed.

If the IIN 202 is found by the POS system 108 to represent a valid card 104 for a 529 plan that can be used at the registered merchant 130, then, starting with step 1210, the POS system 108 may step through each scanned product code for the products that the card holder 102 has presented to the merchant 108 for purchase. In step 1212, the product code for each product is checked against the local database 110. If the product code for the product is a qualified product code, then the POS system 108 does not reject the purchase of the particular product, and the price for the product is added to the total purchase for qualified items in step 1214. Otherwise, if the product code is rejected for purchase in step 1216, then the price of the unqualified item for that product code may be added to a remaining balance to be otherwise paid for by other means (using cash, check, or other credit/debit card) not using the 529 plan card 104, step 1216.

In step 1218, the POS system 108 continues processing the product codes of the products to be purchased by the card holder 102 through step 1220 and back to step 1210, until all product codes have been processed by the POS system 108. When processing of the product codes has completed, processing continues with particular reference to FIG. 12B.

In step 1222, the transaction for the total of the qualified purchases is sent to the credit/debit provider (120 in FIG. 1). In step 1224, the credit/debit provider 120 may forward the transaction to the 529 institution 100 for approval. The 529 institution may then check the amount of the forwarded transaction against the accumulated spending limit set in step 508 of FIG. 5, and on screen 900 of FIG. 9, step 1226. If the spending limit has been reached, then the 529 institution 100 may send a rejection message back the debit/credit card provider 120, which may reject the transaction from the merchant 130 in step 1228.

If the spending limit has not been reached, in step 1234, all of the pending trades may be calculated that are present in a trade queue (106 in FIG. 1) for the account 190. The trade queue 106 may be where the pending trades are held, which may be both buy and sell orders, for the account 190 until the trade is executed at time T. However, as explained below, even after a trade is executed at time T, there is still a waiting period before the trade is actually settled. Thus, the total trade balance is calculated, including adding buy orders waiting in the queue, minus the total value of sell orders waiting in the queue, and plus and minus all executed buys and sells that have not been settled, to determine the total credit balance for the account 190.

In step 1236, the amount of the transaction to be covered is compared to the current credit value of the securities determined in step 1234, plus a buffer X for market fluctuation. If this threshold is exceeded by the pending purchase transaction, then processing moves to step 1228 for rejection of the purchase, which may comprise sending a decline notification message to the credit card machine 106. However, if the threshold is not exceeded, in step 1238, then the trigger to sell securities is added to a trade queue (106 in FIG. 1). The trade queue comprises an electronic queue of waiting electronic buy and sell orders to be executed at the next time T at which each particular trade may be executed. Electronic trade queues are well known to those skilled in the art. Many institutions, such as Fidelity Investments, and the like, typically employ electronic trade queues, many of which could be used as the electronic trade queue 106 shown in FIG. 1. In one embodiment, upon the trigger, a sell trade amount is added to the queue, split across the predetermined percentages of securities established in step 505 in FIG. 5, and in screen 300 in FIG. 4. However, the trigger step of step 1238 does not cause an instant settlement of securities, as even with electronic trading, their currently is no means for any such instant settlement. The card holder 102 still needs instant approval of the transaction received from the merchant 130.

Due to the calculation made in step 1236, instant approval of the transaction may be provided in step 1240. In one embodiment, even though funds are not yet available in the cash equivalent portion 192 of the account 190 due to impending settlement, either the 529 institution 100, the credit/debit provider 120 and/or a third party escrow agent may have an escrow account (112 in FIG. 1) that temporary provides funding to cover the transaction to provide such instant approval pending the trade and settlement per the trade orders on the trade queue 106. In the case where the credit/debit provider 120 (which may be a bank for example) is the entity holding the escrow account, the credit balance may be held with respect to the individual card account.

Under U.S. securities regulations, the settlement cycle is known as T+3, shorthand for trade date plus three days. In step 1242, the trades in the queue may then execute on the next trade date. It should also be mentioned that other types of investments, such as money market investments, may even have a shorter settlement time, for example T+1. Once the settlement of the trade is completed in step 1244, any credit balance due to pending trades for the escrow account 112 can be settled.

Figure 13:
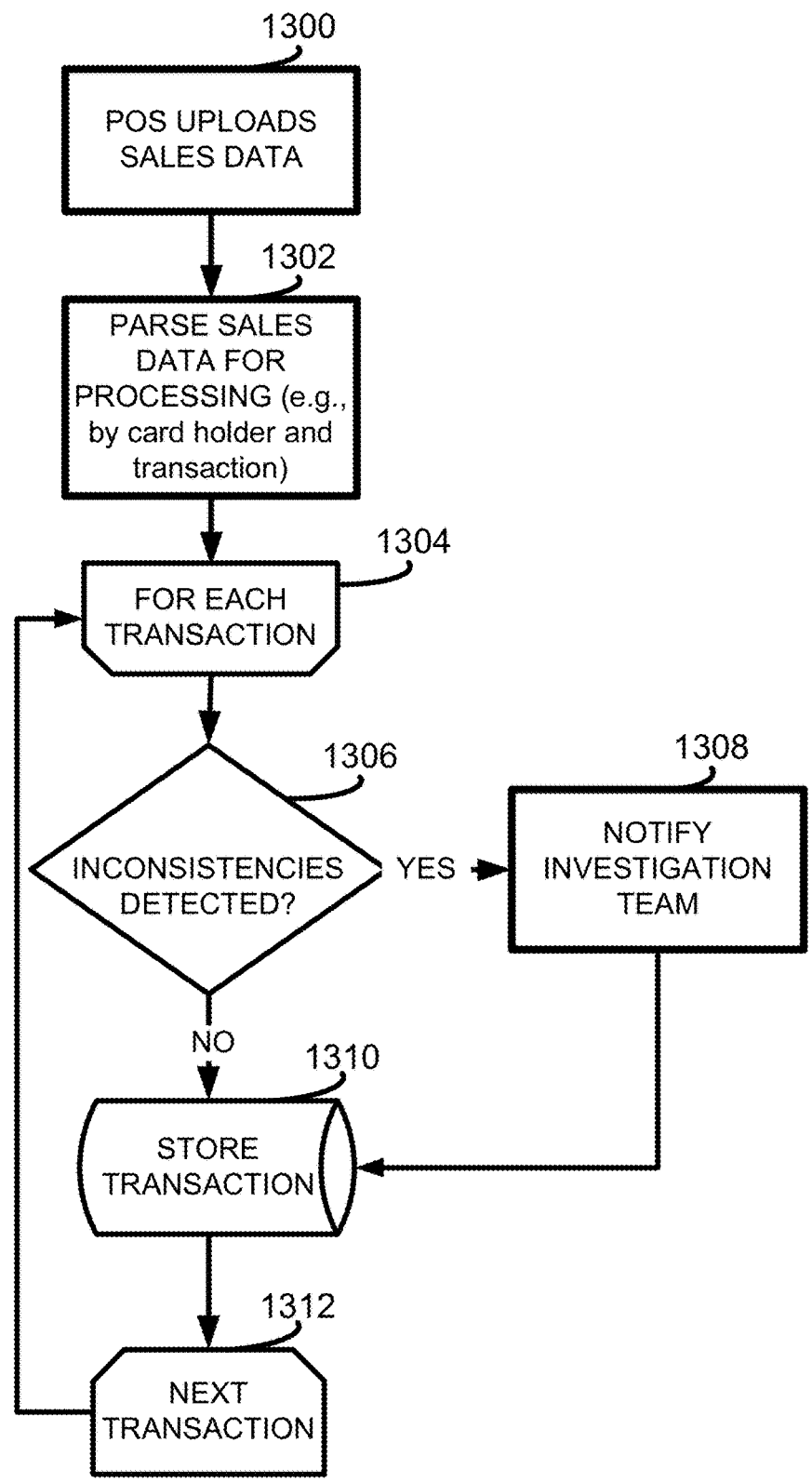
FIG. 13 is a flow diagram for periodic or real-time processing for POS data uploads according to the embodiment of FIG. 1.

With reference to FIG. 13, a flow diagram for periodic or real-time processing for uploading POS data is shown. In one embodiment, it may be advantageous to provide for a periodic upload of sales transactions (which may comprise itemized purchases) directly from the POS system 108 to the service center database 152 for further processing by the service center 150. By way of example, and not by way of limitation, starting with step 1300, the POS system 108 may upload the sales data, for example, for a 24 hour time period, or other period as agreed upon by the parties involved. In step 1302, after the upload by the POS system 108 into the service center database 152, the uploaded data may be parsed by the service center 150 before further processing.

In step 1304, each transaction may be electronically reviewed for inconsistencies using well known algorithms for credit card fraud, and the like. However, in one embodiment other algorithms may be applied to detect abnormalities with respect to 529 plan purchases. For example, while a transaction for a computer printer may have been a qualified transaction, if three computer printers are bought within the same transaction, or within the same year when compared to the same card holder's other transactions, then the a inconsistency may be flagged. In step 1306, if one or more inconsistencies are detected, then the data from the transaction and a notification may be sent to an investigation team member, step 1308. This provides a human check or confirmation of the inconsistency, and allows the team member or management staff to take further action, such as suspending the credit card while the card holder 102, owner 50 and/or merchant is contacted to further investigate the issue.

In step 1310, each transaction is stored. Storage of the transactions provides, as stated above, a means to compare different transactions to detect inter-transactional inconsistencies, and also so that the owner 50 and/or card holder 102 may be provided with transaction records quarterly or annually, or for review by the Internal Revenue Service (IRS) for official audits.

Figure 14:
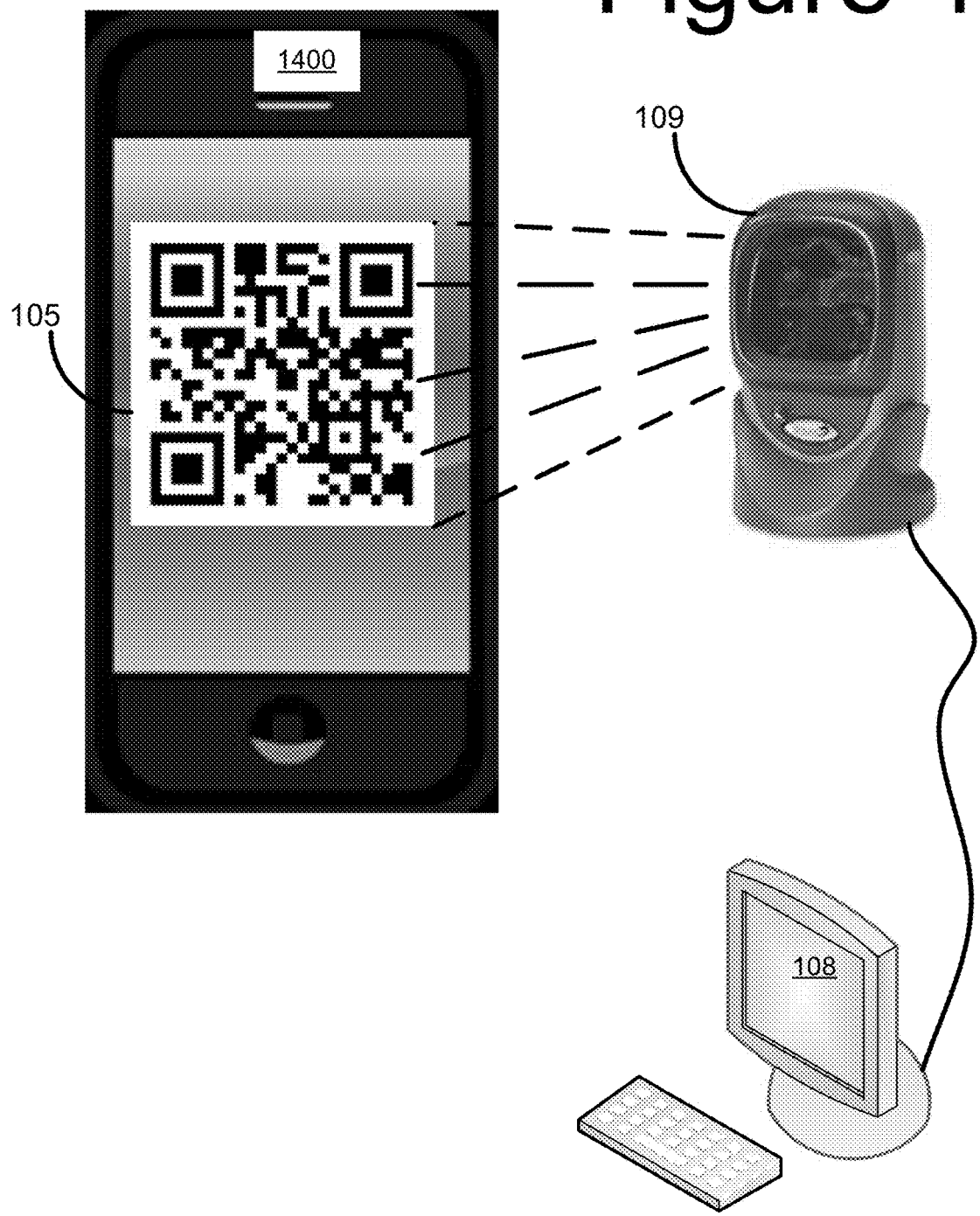
FIG. 14 is illustrates an alternative payment method that can be used with the embodiment of FIG. 1.

With reference to FIG. 14, an alternative payment method in the embodiment of a QR code on a smart phone is illustrated. Instead of issuing a card 104 to the card holder, the card holder 102 may have a mobile app downloaded to his or her smartphone 1400 that can be activated to produce a payment QR code 105 on the smartphone screen. In one embodiment, in addition to a traditional card machine 108, the POS system 108 may further be attached to a QR code reader or combination QR and bar code reader 109 that can be used to both scan product codes and the payment QR code 105. From the payment QR code 105, the POS system may read the card number 200, including the IIN 202 as described above, and processing of the payment may the proceed as described above.

Those skilled in the art may recognize that other current and further payment methods may be used over and above a traditional debit/credit card 104 or QR code 105 with the systems and methods described herein. By way of example and not by way of limitation, emerging technologies in Bluetooth or near field communication (NFC) technologies may be used to transmit payment information to the POS system 108 during purchasing.

Further, account management by the owner 50 or the card holder 102 may be accomplished using the same mobile app or a different mobile app for account management. Still further, account management may also be performed through a voice response system, or the like, providing the owner 50 and card holder 102 with multiple ways to manage the 529 account 190, including changing the securities portfolio for the securities portion 194, executing trades, or the like.

Those skilled in the art would recognize that the system and method described herein could easily be applied to other types of accounts to make qualified purchases, including, but not limited to, Coverdell education savings accounts (ESAs), flexible spending accounts (FSAs), cafeteria plans, IRA distributions, or the like. Some of these accounts typically have mixed mutual funds and individual securities investments for the securities portion 194 of the account 190, or securities only, with no mutual funds. Thus, over and above the distribution percentages for fund types 302, 304 and 306 illustrated in screen 300 in FIG. 4, a real-time trade request system may be used through the internet, mobile app, live customer service, a financial advisor or a voice response system to fund the cash or cash equivalents portion of the account 190.

It should be understood, of course, that the foregoing relates to exemplary embodiments of the invention and that modifications may be made without departing from the spirit and scope of the invention as set forth in the following claims.

The invention claimed is:

1. A non-transitory product code monitoring and tracking point of sale system, comprising:
    a card machine with a processor;
    a database comprising a securities-based account comprising cash data in the database for tracking a value of a cash portion of the account, and securities data in the database for keeping track of the value of one or more securities associated with the account to track a securities portion of the account, wherein the securities are defined as things that are tradable for value;
    a first set of instructions for changing data in the database for setting an account spending limit for the securities-based account;
    a second set of instructions executable on the processor capable of comparing an issuer identification number to a database of one or more issuer identification numbers to authenticate an attempted purchase;
    trade triggering instructions comprising instructions to read data in the database comprising one or more trading triggering parameters, at least one of the trading parameters defined as a percentage of the available distribution of the securities;
    a plurality of product codes of qualified retail items each entered into the point of sale system database for each qualified retail items;
    a third set of instructions executable on the processor for changing data in the database for triggering one or more trades of the one or more securities, to cover a purchase of one or more qualified retail items, the qualified retail items defined as items available for purchase that can be purchased using the using the securities-based account if the purchase does not cause the spending limit to be exceeded based on the parameters;
    wherein the one or more qualified retail items are of the type selected from the group consisting of: school supplies, books, paper, pencils, computers, notebooks, notepads, medical supplies, food, tuition, medical insurance, 529 savings plan qualified items, Coverdell education savings account (ESA) qualified items, flexible spending accounts (FSA) qualified items, cafeteria plans, and individual retirement account (IRA) distribution qualified items;
    one or more merchant codes entered into a service center database that specify registered merchants from which a card holder can make qualified purchases of the one or more qualified retail items, wherein for each of one or more institutions, a subset of the merchant codes are downloaded to a local institution database for each institution to identify the registered merchants that can accept a card from the card holder;
    a service center database that comprises a registered merchant table, comprising merchant records, wherein each merchant record stores one of said merchant codes to identify the registered merchants, wherein the service center database is used to push the registered merchant table to the local institution database, wherein each time the card holder presents a card, a merchant's point of sale system (POS) can determine whetherto run a qualification process or not, wherein registered merchants, having completed the qualification process, may then pass a subtotal of only qualified items to the card machine, which then can process a transaction using the card, wherein when the transaction arrives at the institution, the institution may read the merchant code and recognize it as identifying one of said registered merchants within the local institution database and proceed with a next step of the transaction; and
    one or more product codes of qualified retail items entered into a local POS database of each registered merchant, wherein after each registered merchant enters the product codes, said product codes are uploaded to a product data table within the service center database,
    wherein a whole securities-based account number for the card comprises:
        a six-digit issuer identification number (IIN) 202, the first digit of which is the major industry identifier (MII),
        a variable length individual account identifier,
        a check digit,
    wherein the six-digit IIN of the card identifies the institution for which the card is issued and the whole card number identifies the securities-based account to which the card is tied.

2. The system of claim 1, wherein the spending limit comprises a limit for spending over a period of time.

3. The system of claim 2, wherein the period of time is one year.

4. The system of claim 2, wherein the period of time is a school semester.

* * * * *